United States Patent Office 3,745,134
Patented July 10, 1973

3,745,134
RESILIENT CELLULAR POLYURETHANES
Walter Fensch, Hannover, Germany, assignor to BASF Wyandotte Corporation, Wyandotte, Mich.
No Drawing. Continuation-in-part of abandoned application Ser. No. 791,503, Jan. 15, 1969. This application Mar. 22, 1971, Ser. No. 126,973
Claims priority, application Germany, June 7, 1968, P 17 69 550.0
Int. Cl. C08g 22/16, 22/46
U.S. Cl. 260—2.5 AM    7 Claims

ABSTRACT OF THE DISCLOSURE

A method is provided for making a resilient elastomeric cellular polyurethane having a density of at least about 25 pounds per cubic foot adapted to retain its original resiliency wherein an organic diisocyanate is reacted with a high molecular weight organic polyol, water and two organic chain extenders, one having a molecular weight below 500 and the other having a molecular weight of 500 to about 600 and containing ester and/or ether groups.

---

This invention relates generally to cellular polyurethanes and, more particularly, to a method for making a cellular polyurethane having a more stable resiliency. This application is a continuation-in-part of my application Ser. No. 791,503 filed Jan. 15, 1969, now abandoned.

It has been proposed heretofore to prepare a cellular polyurethane by reaction of an organic polyisocyanate and a high molecular weight polyhydroxy compound, water and an organic chain extender having alcoholic hydroxyl groups. One such method is disclosed, for example, in U.S. 2,850,464. In accordance with the process of that patent, the density of the cellular polyurethane is controlled by reacting a polyurethane prepolymer with both water and glycol or amino alcohol. Such a process has the disadvantage of being costly because it is first necessary to prepare the prepolymer and the further disadvantage that the prepolymer does not produce a product which retains its initial resiliency over an extended period of time.

It has also been proposed in German application DAS 1,264,764 to prepare a cellular polyurethane by reacting substantially simultaneously a high molecular weight polyhydroxy compound, water and a low molecular weight glycol with a particular diisocyanate which is the reaction product of a carbodiimide and 4,4'-diphenylmethane diisocyanate. The product obtained by such a process has many advantages but has the disadvantage, particularly when one of the polyhydroxy compounds is a polycaprolactone, of not retaining its initial resiliency for an extended period of time. Consequently, molded articles of such cellular materials frequently stiffen and become hard and nonresilient in storage or in use. Such cellular polyurethanes are useless for making springs, shock absorbers or the like for vehicle suspension systems where repeated flexing over extended periods of time without stiffening or loss of resiliency is required.

It is, therefore, an object of this invention to provide a method for making a cellular polyurethane adapted to retain its initial resiliency. Another object of the invention is to provide a cellular polyurethane having a density of at least about 25 lbs. per cubic foot having a resiliency which adapts it for use in shock absorbers, spring elements for the suspension systems of automobiles or the like. Still another object of the invention is to provide a method for making cellular polyurethanes having improved resiliency and tear strength and a density of 25 lbs. per cubic foot or more. A more specific object of the invention is to provide a one-step method for making a cellular polyurethane having a density of 25 lbs. per cubic foot or more and a more permanent resiliency particularly when the polyhydroxy compound of high molecular weight used to make the polyurethane is a polycaprolactone.

The foregoing objects and others are accomplished in accordance with this invention, generally speaking, by providing a method wherein an organic diisocyanate is reacted with a substantially linear polyhydroxy compound having a molecular weight of from about 1,000 to about 3,000 and a hydroxyl number of from about 112 to about 37, water, an organic chain extender having alcoholic hydroxyl groups and a molecular weight below 500, and an organic chain extender having alcoholic hydroxyl groups and a molecular weight of from 500 to about 600, preferably about 530 to about 550, and having ester or ether groups. The organic diisocyanate is reacted with the other components of the reaction mixture substantially simultaneously. In a preferred embodiment of the invention, all of the components of the reaction mixture except the diisocyanate are first mixed together substantially uniformly and the resulting mixture is then mixed with the diisocyanate.

Although the invention broadly contemplates the use of any suitable organic diisocyanate such as, for example, 4,4'-diphenylmethane diisocyanate alone, meta or paraphenylene diisocyanate, 2,4 or 2,6 toluylene diisocyanates or mixtures thereof and the like, best results are obtained when the diisocyanate is the reaction product of a carbodiimide with 4,4'-diphenylmethane diisocyanate in admixture with 4,4'-diphenylmethane diisocyanate. The reaction product is prepared as described in the aforesaid German patent application by heating a mixture of the carbodiimide and 4,4'-diphenylmethane diisocyanate preferably to a temperature of from about 250° C. to about 270° C. until all of the carbodiimide has reacted. In a preferred embodiment, an excess of 4,4'-diphenylmethane diisocyanate is used in order that a mixture of reaction product and unreacted 4,4'-diphenylmethane diisocyanate will be obtained. Usually, a ratio of at least about 10 mols 4,4'-diphenylmethane diisocyanate per mol of carbodiimide are mixed together but best results are obtained when the molar ratio is about 13:1. Diphenylcarbodiimides are preferred and, particularly, alkyl substituted diphenylcarbodiimides. The phenyl rings of the carbodiimide can be mono-, di-, tri-, or tetra-, alkyl substituted or unsubstituted. The alkyl radical can be methyl, ethyl, propyl, butyl, hexyl, dodecyl or the like. The most preferred carbodiimide is 2,5-2',5'-tetraisopropyl diphenylcarbodiimide. The actual chemical formula of the reaction product of the carbodiimide and 4,4'-diphenylmethane diisocyanate has not been definitely established but it is believed it is a compound formed by reaction of 2 mols of the diisocyanate with 1 mol of the carbodiimide having the following formula:

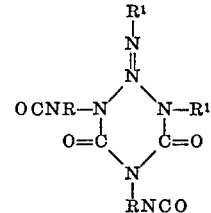

wherein R is phenylene or naphthylene and $R^1$ is phenyl or alkyl substituted phenyl.

The products prepared in accordance with the process of this invention retain their initial resiliency for an almost unlimited period of time. In other words, they do not stiffen from a second cure in storage. Furthermore, the initial properties of the product of this invention are similar to those of the prior art product so it can be directly substituted in already available shock absorbers, spring elements or the like for the inferior product of the prior art. Another advantage of the product of this invention over those of the prior art is that it does not require annealing at an elevated temperature to develop its optimum physical properties. It has been found it can be used after 3 or 4 days storage at room temperature without annealing and that it develops its optimum properties in about 12 to 14 days at room temperature.

In practicing the process of this invention, best results are obtained when the molar ratio of chain extender having a molecular weight of from 500 to about 600 to chain extender having a molecular weight below 500 is from about 3.25 to about 4.2 mols of the lower molecular weight chain extender per mol of the chain extender having the higher molecular weight. The preferred ratio of total —OH groups (i.e., —OH compound having a molecular weight of from about 1,000 to about 3,000, water plus both organic chain extenders) to —NCO groups is from about 0.7:1.3 —NCO per —OH. The preferred molar ratio of compound having a molecular weight of from about 1,000 to about 3,000 to the combination of organic chain extenders and to water is 1 mol of the higher molecular weight polyol per 0.8 to 0.95 mol organic chain extenders to 0.56 to 0.78 mol water. The most preferred ratio is 1 mol polyol having a molecular weight of 1,000 to 3,000 per 0.87 mol of organic chain extender mixture per 0.68 mol water.

Any suitable substantially linear hydroxy terminated polyester or poly(alkylene ether)glycol having a molecular weight of from about 1,000 to about 3,000 and a hydroxyl number of from about 112 to about 37 may be used as the high molecular weight hydroxy compound. The polyester may be one prepared by esterification of a dicarboxylic acid and a glycol or a polycaprolactone ester. Any of the dicarboxylic acids heretofore disclosed as suitable for making polyesters of this type can be used such as, for example, adipic acid, succinic acid, sebacic acid, azelaic acid, maleic acid or the like. The glycol can be any of the glycols heretofore disclosed as suitable for making polyesters of this type such as, for example, ethylene glycol, diethylene glycol, propylene glycol, butylene glycol, pentylene glycol, dipropylene glycol, glycerol-mono methyl ether, glycerol-mono ethyl ether and the like. Mixtures of these glycols can be used. The poly(alkylene ether) glycol can be poly(propylene ether)glycol, a polyoxyethylene-oxypropylene glycol or the like, but it is preferably poly(tetramethylene)ether glycol. The polycaprolactone ester is preferably prepared from ε-caprolactone and one of the glycols mentioned above for use in making the polyester. Polyesters and polyethers of the same composition as those listed above but having a molecular weight of from 500 to about 600 can be used as one of the chain extenders.

The organic chain extender having a molecular weight below 500, preferably below 134, may be any suitable alkylene glycol such as, for example, ethylene glycol, propylene glycol, butylene glycol, pentylene glycol, hexanediol or the like. This glycol can be used in admixture with a triol as the lower molecular weight chain extender such as, for example, hexanetriol (molecular weight 134), trimethylolpropane, triethylolpropane, glycerine or the like. Usually, the amount of triol will be very small, often below 5 mol percent of the chain extender having a molecular weight of below 500. The molar ratio of chain extender having a molecular weight of 500 to about 600 to chain extender below 500 molecular weight is from about 0.174 to 0.198 and 0.644 to 0.732.

Although the compound having a molecular weight of from about 1,000 to about 3,000 and the chain extender having a molecular weight of 500 to about 600 can be of different compositions (i.e., one can be a polyester and the other a poly(alkylene ether)glycol, it is preferred that the chain extender be a polyester when the higher molecular weight compound is a polyester and that the chain extender be a poly(alkylene ether)glycol when the higher molecular weight compound is a poly(alkylene ether)glycol. Best results have been obtained when both of the compounds are hydroxy polycaprolactones.

It is preferred to use as a catalyst in the reaction mixture a water resistant amine type catalyst, such as, diethylene diamine, triethylene diamine, 1-alkyl-4-dialkyl amino alkylene piperazine such as, for example, 1-methyl-4-dimethyl amino ethylene piperazine, triethylamine, tetramethyl-1,3-butane diamine, organo-tin compounds, such as, trimethyl tin hydroxide, tributyl tin hydroxide, trimethyl tin chloride, triethyl tin chloride, organo-lead and organo-mercury compounds and the like. Various other additives may be included in the reaction mixture such as, for example, silicone oils, siloxane-oxyalkylene-block copolymers, castor oil, triphenylphosphite, citric acid, adipic acid, phenylmercury acetate, fillers, such as, asbestos powder, talc, aluminum hydroxide and the like.

In one embodiment, the polyhydroxy compound having a molecular weight of from about 1,000 and about 3,000 is dehydrated until substantially anhydrous and melted at about 80° C. The melted compound is stirred while the chain extenders and any other additives desired in the mixture are added thereto. The catalyst is usually included in this mixture and it is advisable not to heat the mixture above about 60° C. after the catalyst and water have been added in order to avoid water losses from the reaction mixture. It is usually advisable to stir the mixture for about 20 minutes to be sure that a mixture having a substantially uniform composition is obtained.

The preferred carbodiimide reaction product is prepared in a separate vessel by first melting the 4,4'-diphenylmethane diisocyanate and adding the carbodiimide thereto while the temperature of the diisocyanate is at about 90° C. and is being slowly stirred. As soon as the mixture becomes a clear solution, stirring is stopped and the mixture is cooled to room temperature in the closed vessel. When a mixture of about 13 mols 4,4'-diphenylmethane diisocyanate and 1 mol carbodiimide of the type disclosed herein is used, the product is believed to be the compound formed from 2 mols of 4,4'-diphenylmethane diisocyanate and 1 mol carbodiimide mixed with liquid 4,4'-diphenylmethane diisocyanate of the formula hereinabove set forth. Up to about 85% by weight of the mixture can be 4,4'-diphenylmethane diisocyanate without the mixture becoming a solid but preferably the mixture contains about 80% by weight 4,4'-diphenylmethane diisocyanate.

To prepare a cellular polyurethane elastomer from the two components prepared hereinbefore, the mixture of reactive hydroxy compounds (polyol component) and the diisocyanate are mixed by hand or by mechanical stirring in the desired proportions. Best results are obtained when the polyol component is at a temperature of from about 55° C. to about 65° C., preferably about 60° C., and the diisocyanate component is at a temperature of from about 20° C. to about 40° C., preferably about 35° C. The resulting mixture can be permitted to foam freely or foamed in molds under pressure.

In molding the cellular product provided by this invention, the foamable reaction mixture is injected or otherwise introduced into preheated molds where it foams and expands to fill the mold. After solidification, the molded article can be removed from the mold. Preferably, the product is left in the mold for from about 15 to 20 minutes. If desired, the product can be annealed at about 90° C. for about 12 to about 24 hours but, as pointed out hereinbefore, it is not necessary to use a heat treatment because the product will attain good physical characteristics in storage at room temperature within 3 or 4 days. However, optimum physical characteristics are not attained until after about 4 to 6 weeks at room temperature.

In molding cellular articles, it is preferred to preheat the mold to from about 60° C. to about 85° C., preferably about 70° C. to about 75° C., and to maintain the temperature within the mold while the reaction mixture is foaming at from about 80° C. to about 110° C. With such temperatures, the molded article can be removed from the mold after about 15 to 20 minutes molding time.

Of the various catalysts and modifiers, it has been found that best results are usually obtained with a mixture of 1-methyl-4-dimethylamino ethylene piperazine, phenylmercury acetate and citric acid or adipic acid or sodium chloroacetate. Up to about 50% by weight of the cellular product can be a solid filler.

The invention is further illustrated by the following examples:

EXAMPLE I

About 1,000 parts by weight of a substantially anhydrous substantially linear hydroxyl polyester having a molecular weight of about 2,000 and a hydroxyl number of about 56 prepared by esterifying adipic acid and ethylene glycol are thoroughly mixed in molten condition at about 80° C. with about 50 parts of a linear hydroxyl polyester having a molecular weight of about 534 and a hydroxyl number of about 210 also prepared by esterifying adipic acid and ethylene glycol, about 31 parts 1,4-butanediol, about 16 parts dimethylsilane silicone oil, about 8 parts 23% aqueous solution of 1-methyl-4-dimethyl amino ethyl piperazine, about 1.6 parts phenyl mercury acetate, about 1.2 parts citric acid or sodium chloroacetate, about 150 parts talc and about 7.5 parts sodium aluminum silicate.

The polyol component thus obtained is heated to about 60° C. and subsequently reacted with about 351.2 parts of a mixture of 4,4'-diphenylmethane diisocyanate and about 20% by weight of the reaction product of 4,4'-diphenylmethane diisocyanate and 2,5-2',5'-tetraisopropyl diphenyl carbodiimide obtained when the two are heated at about 90° C. until the mixture is clear.

The resulting foamable mixture obtained by mixing the polyol component and the diisocyanate component is permitted to foam and expand in a closed mold preheated to about 70° C. to 75 C°. and left in the closed mold at about 80° C. for about 15 to 20 minutes. Afterwards, it is removed from the mold and the molded part is annealed at about 80° C. for about 12 hours or stored at room temperature without this second heat treatment for about 3 to 4 days. After this period, the molded part can be used. The physical characteristics continue to improve during the next 4 to 6 weeks at room temperature.

This example is repeated except the foamable mixture is permitted to foam and expand freely in an open mold. The resulting product is sufficiently tack free to be handled after about 15 to 20 minutes.

EXAMPLE II

Example I is repeated, however, about 50 parts of a linear hydroxyl caprolactone prepared from ε-caprolactone and ethylene glycol having a molecular weight of about 534 and a hydroxyl number of about 210 are used instead of the 50 parts hydroxyl polyester having a molecular weight of about 534 of Example I.

EXAMPLE III

Example I is repeated with the exception that about 1,000 parts of linear hydroxyl polycaprolactone prepared from ε-caprolactone and ethylene glycol and having a molecular weight of about 2,000 and a hydroxyl number of about 56 are used instead of the hydroxyl polyester of Example I having a molecular weight of 2,000; and about 50 parts linear hydroxyl polycaprolactone prepared from ε-caprolactone and ethylene glycol and having a molecular weight of about 534 and a hydroxyl number of about 210 are used instead of the hydroxyl polyester having a molecular weight of 534 of Example I.

EXAMPLE IV

Example I is repeated, with the following exceptions:

(a) About 1,000 parts of linear poly(tetramethylene ether)glycol having a molecular weight of about 2,000 and a hydroxyl number of about 56 are used instead of the hydroxyl polyester having a molecular weight of about 2,000 of Example I, and (b) About 50 parts linear hydroxyl poly(tetramethylene ether)glycol having a molecular weight of about 534 and a hydroxyl number of about 210 are used instead of the 50 parts of hydroxyl polyester having a molecular weight of 534 of Example I.

EXAMPLE V

Example I is repeated with the exception that about 29.3 parts 1,4-butanediol and about 1.6 parts hexanetriol are used instead of the 31 parts 1,4-butanediol used in Example I.

EXAMPLES VI, VII and VIII

Example I is repeated using a polyol component of the following composition:

About 1,000 parts by weight of a polyhydroxyl compound having a molecular weight of about 2,000.

About 50 parts by weight of a polyhydroxyl compound having a molecular weight of about 534.

About 31 parts by weight 1,4-butanediol.

About 16 parts by weight dimethyl silicone oil.

About 8 parts by weight of an aqueous catalyst solution comprising about 76.9% water and 23.1% of a 50–50 mixture of the piperazine derivative of Example I and triethylene diamine.

About 1.3 parts by weight citric acid.

About 0.1 part by weight triphenyl phosphite.

About 150 parts by weight talc.

About 7.5 parts by weight sodium aluminum silicate.

About 10 parts by weight azobisformamide.

About 5 parts by weight mica.

The polyhydroxyl compounds of Example VI are both the same as in Example I. The poly(tetramethylene ether) glycols of Example IV are used in Example VII. The polycaprolactone esters of Example III are used in Example VIII.

Each of the cellular elastomers produced according to these Examples I–VIII can be injection molded and the cured molded product, after annealing for 13 hours at about 80° C., will have the following physical characteristics:

TABLE

| | |
|---|---|
| Density _____g./cm.$^3$__ | About 0.5 |
| Tear resistance _____kp./cm.$^2$__ | About 49 |
| Elongation _____percent__ | About 400 |
| Tear propagation resistance _____kp./cm.__ | About 14 |
| Shock elasticity _____percent__ | About 50 |
| Compression set at room temperature _do____ | About 7.5 |

| Spring way in mm.: Pressure take-up: | Stress in kp. |
|---|---|
| 5 _____ | About 112 |
| 10 _____ | About 156 |
| 12 _____ | About 183 |

A series of products may be prepared to illustrate the superior resiliency retention properties of the product of this invention over those of the prior art as follows:

Example IX—same process and formulation as that of Example I.

Example X—same as IX except 40.5 parts 1,4-butanediol are used as the only organic chain extender.

Example XI—same as Example IX except 1,000 parts of the polycaprolactone 2,000 M.W. and 53.4 parts of the polycaprolactone 534 M.W. of Example III are substituted for the polyesters of Example IX.

Example XII—same as Example XI except 10.6 parts diethylene glycol are substituted for the polycaprolactone 534 M.W.

Example XIII—same as Example XI except 40.5 parts 1,4-butanediol are used and the polycaprolactone 534 is deleted.

Example XIV—same as Example XI except 1,000 parts polytetramethylene ether glycol M.W. 2,000 is substituted for the polycaprolactone 2,000 M.W.

Example XV—same as Example IX except 1,000 parts polytetramethylene ether glycol M.W. 2,000 and 10.6 parts diethylene glycol are substituted for the polyesters.

Example XVI—same as Example XV except 40.5 parts 1,4-butanediol are used and no diethylene glycol is used.

Example XVII—same as Example XV except 53.4 parts polytetramethylene ether glycol 534 are substituted for the diethylene glycol.

The products of Examples IX through XVII may be stored at room temperature and samples thereof compressed at the end of eight days and after six weeks to illustrate the comparative increase in stiffness thereof. A cylindrical plug of each sample approximately one inch in diameter and one-half inch in height may be supported on a steel plate and a load applied until the cylinder is compressed 5, 10 and 12 mm. in height. The load measured in kiloponds required to compress the product increases as the stiffness of the product increases. The following results illustrate the relative resiliency of the samples after the first six days storage and the increase in stiffness after six weeks storage.

|  | Compression in mm. | Kiloponds | | | | | | | | |
| --- | --- | --- | --- | --- | --- | --- | --- | --- | --- | --- |
|  |  | IX | X | XI | XII | XIII | XIV | XV | XVI | XVII |
| After 8 days storage | 5 | 90 | 92 | 96 | 80 | 93 | 84 | 100 | 94 | 83 |
|  | 10 | 145 | 148 | 142 | 115 | 144 | 124 | 148 | 146 | 124 |
|  | 12 | 178 | 187 | 170 | 137 | 180 | 144 | 173 | 155 | 150 |
| After 6 weeks | 5 | 92 | 124 | 95 | 111 | 122 | 86 | 138 | 132 | 86 |
|  | 10 | 146 | 200 | 149 | 124 | 205 | 125 | 189 | 194 | 127 |
|  | 12 | 180 | 228 | 168 | 194 | 235 | 143 | 210 | 215 | 155 |

In the above series, Examples X, XII, XIII, XV and XVI do not combine two organic chain extenders as provided by this invention. A comparison of the kiloponds required to compress the sample 5, 10 or 12 millimeters after 8 days and after 6 weeks indicates that these samples in each case have stiffened. However, this is not true of Examples IX, XI, XIV and XVII which are embodiments of the invention. The stiffness of the products of Examples X, XII, XIII, XV and XVI is even greater after longer storage periods.

Although the invention has been described in considerable detail in the foregoing, it is to be understood that alterations can be made by those skilled in the art without departing from the spirit and scope of the invention.

What is claimed is:

1. A resilient elastomeric cellular polyurethane having a density of at least about 25 pounds per cubic foot and an improved resiliency retention prepared by the process which comprises reacting substantially simultaneously (1) a substantially linear organic polyester or poly(alkylene ether)glycol having a molecular weight of from about 1,000 to about 3,000, (2) two different organic chain extenders having alcoholic hydroxyl groups, a first organic chain extender having a molecular weight below about 134 consisting essentially of a glycol or a mixture of a glycol and triol and a second organic chain extender having a molecular weight of from 500 to about 600 having ester or ether groups, the molar ratio of the chain extenders being from about 3.25–4.2 mols of the first per mol of the second, (3) water and (4) an organic diisocyanate, the ratio of total —OH of (1), (2) and (3) to —NCO being 1 to from 0.7 to 1.3 and the molar ratio of (1) to (2) to (3) being 1 to 0.8–0.95 to 0.56–0.78, respectively.

2. The product of claim 1 wherein the compound having a molecular weight of from about 1,000 to about 3,000 is a substantially linear hydroxyl polyester prepared by esterifying adipic acid and ethylene glycol, the chain extenders are 1,4-butanediol and a hydroxyl polyester prepared by esterifying adipic acid and ethylene glycol and the diisocyanate is a mixture of 4,4′-diphenylmethane diisocyanate and a carbodiimide.

3. The product of claim 1 wherein the polyisocyanate comprises the reaction product of a carbodiimide and 4,4′-diphenylmethane diisocyanate.

4. The product of claim 1 wherein the compound having a molecular weight of from about 1,000 to about 3,000 and the said second chain extender are hydroxypolycaprolactone esters.

5. The product of claim 1 wherein the higher molecular weight hydroxyl polyester or poly(alkylene ether) glycol has a molecular weight of about 2,000.

6. The product of claim 3 wherein the mixture of carbodiimide-4,4′-diphenylmethane diisocyanate reaction product and 4,4′-diphenylmethane diisocyanate contains from about 80% to about 85% of the said reaction product.

7. The product of claim 1 wherein the higher molecular weight compound and the said second chain extender are both poly(tetramethylene ether)glycol.

References Cited

UNITED STATES PATENTS

| 2,850,464 | 9/1958 | Mitchell | 260—2.5 |
| 2,990,379 | 6/1961 | Young et al. | 260—2.5 |
| 3,108,976 | 10/1963 | Knox | 260—2.5 |
| 3,194,773 | 7/1965 | Hostettler | 260—2.5 |
| 3,397,158 | 8/1968 | Britain et al. | 260—2.5 |
| 3,558,529 | 1/1971 | Whitman et al. | 260—2.5 |
| 3,591,532 | 7/1971 | Abercrombie et al. | 260—2.5 |

FOREIGN PATENTS

| 1,264,764 | 3/1968 | Germany | 260—2.5 |

MAURICE J. WELSH, Primary Examiner

C. W. IVY, Assistant Examiner

U.S. Cl. X.R.

260—2.5 AP, 2.5 AN, 2.5 AT, 2.5 BF